(12) United States Patent
Ghazal et al.

(10) Patent No.: US 6,999,967 B1
(45) Date of Patent: Feb. 14, 2006

(54) SEMANTICALLY REDUCING THE NUMBER OF PARTITIONS INVOLVED IN A JOIN

(75) Inventors: Ahmad Said Ghazal, Redondo Beach, CA (US); Paul Laurence Sinclair, Manhattan Beach, CA (US)

(73) Assignee: NCR Corp., Dayton, OH (US)

( * ) Notice: Subject to any disclaimer, the term of this patent is extended or adjusted under 35 U.S.C. 154(b) by 490 days.

(21) Appl. No.: 10/036,016

(22) Filed: Dec. 26, 2001

(51) Int. Cl.
    *G06F 17/30* (2006.01)
(52) U.S. Cl. .......................... 707/101; 707/3; 707/102
(58) Field of Classification Search .................... 707/1, 707/2, 3, 4, 5, 6, 7, 8, 9, 10, 102
    See application file for complete search history.

(56) References Cited

U.S. PATENT DOCUMENTS

| | | | |
|---|---|---|---|
| 6,081,801 A * | 6/2000 | Cochrane et al. ............... 707/3 |
| 6,112,198 A * | 8/2000 | Lohman et al. ................ 707/3 |
| 6,263,331 B1 * | 7/2001 | Liu et al. ........................ 707/4 |
| 6,567,802 B1 * | 5/2003 | Popa et al. ..................... 707/3 |
| 6,609,131 B1 * | 8/2003 | Zait et al. .................... 707/102 |
| 6,662,175 B1 * | 12/2003 | Ghazal et al. ................. 707/2 |

* cited by examiner

*Primary Examiner*—Jeffrey Gaffin
*Assistant Examiner*—Yicun Wu
(74) *Attorney, Agent, or Firm*—James M. Stover

(57) ABSTRACT

A method, computer program and system for joining two tables, $t_1$ and $t_2$ are described. Each table contains rows and columns and is divided into one or more partitions. A correlation function is calculated between a first correlated value column of table $t_1$ and a second correlated value column of table $t_2$. Following a query request, a joining algorithm is used to join $t_1$ and $t_2$, using a reduced set of partitions based in part upon the correlation function.

40 Claims, 13 Drawing Sheets

SEMANTICALLY REDUCING THE NUMBER OF PARTITIONS INVOLVED IN A JOIN

CROSS-REFERENCE TO RELATED APPLICATION

This application claims priority from U.S. application Ser. No. 09/850,765, filed on May 8, 2001, by Ahmad Ghazal and Paul Sinclair, and titled "Semantic Query Optimization Using Value Correlation," now U.S. Pat. No. 6,662,175, issued on Dec. 9, 2003.

BACKGROUND

Relational database systems allow data to be stored in tables that are organized as a set of columns and rows. Standard commands are used to define the columns and rows of tables, and data is subsequently entered in accordance with the defined structure. The defined table structure is logically maintained, but may not correspond to the physical organization of the data. For example, the data corresponding to a particular table may be divided among a number of physical hardware storage facilities.

Users of relational database systems require the minimum time possible for execution of complex queries against a large database. The organization of data corresponding to tables defined in a relational database system may influence the time required to execute a common query. If the data is properly organized, performance can be improved by searching only a part of the data for queries that can take advantage of that organization.

Given a particular change in the organization of data, such as partitioning, particular types of searches may be adversely impacted in terms of efficiency if they are performed without any adjustment. Many factors may influence the adjustment of a search type that is to be performed with respect to a new organization of data. Such factors include the file system that identifies the location of the data and its associated information, and the desired outcome of the search. Furthermore, given structural constraints such as functional dependencies, key dependencies, value constraints, and referential constraints defined in the database, the query can be rewritten to increase its efficiency. Considering and addressing these factors together can make a search more efficient.

SUMMARY

In general, in one aspect, the invention features a method of joining two tables, $t_1$ and $t_2$. Each table contains rows and columns and is divided into one or more partitions. The method includes calculating a correlation function between a first correlated value column of table $t_1$ and a second correlated value column of table $t_2$. Following a query request, the method further includes a joining algorithm to join $t_1$ and $t_2$, using a reduced set of partitions based in part upon the correlation function.

Implementation of this invention may include one or more of the following. At each iteration of the joining algorithm, the method may calculate a set of partitions in each table to be joined. Each set of partitions may be defined by a starting partition number and by the number of partitions in each set, $f_1$ and $f_2$, respectively. A join may be performed on the reduced set of partitions from each table. If there are more than two empty partitions, the number of partitions in each set may be increased. Thus the active partitions in the span of $f_1$ and $f_2$ partitions may be contiguous. At the next iteration, the starting partition number for each set of partitions may be incremented, and the join algorithm may be performed on the new set of partitions. The method may iterate until all partitions have been subjected to the joining algorithm. In another implementation, the algorithm may iterate until there are no more non-eliminated partitions.

The correlation function may be calculated by joining table $t_1$ to table $t_2$ using PK=FK as the join condition to produce a join result having rows, each row including a value from $cv_1$ and a value from $cv_2$. In this implementation, PK may denote a primary key column in table $t_1$, FK may denote a foreign key column in table $t_2$, $cv_1$ may denote a first correlated value column in table $t_1$, and $cv_2$, denotes a second correlated value column in table $t_2$. The method may create an initial running constraint comprising a null range. A derived constraint rule having the form $$(PK = FK) \; cv_2 + c_1 \leq cv_1 \leq cv_2 + c_2,$$

Where $c_1$ and $c_2$ are constants, and "→" means "implies" may be produced by computing a new constraint (NEW) having a range, and modifying RC by merging the range of NEW with the range of RC for each row in the join result.

The number of partitions in each table to be joined at each iteration, $f_1$ and $f_2$, respectively, may be calculated as follows. A parameter n may be calculated to be the number of contiguous partitions in table $t_1$ that may have rows matching rows in a single partition of table $t_2$. The parameter n may be calculated from the equation $n=pc_2-pc_1+1$. The parameters $pc_1$ and $pc_2$ may be called partitioning correlation coefficients. The partitioning correlation coefficient $pc_1$ may be set equal to the value of (SIGN($c_1$)*CEILING(ABS ($c_1$)/p)), and the partitioning correlation coefficient $pc_2$ may be set equal to the value of (SIGN($c_2$)*CEILING(ABS($c_2$)/p)). The maximum number of file contexts, m, may be calculated based upon the amount of available memory. The parameter $f_2$ may be set equal to the smallest integer value that is equal to or greater than the value of ((m−n)/2), and the parameter $f_1$ may be set equal to $n+f_2-1$.

At each iteration the starting partition numbers, $P_1$ and $P_2$, of each table to be joined may be calculated as follows. $P_2$ may be set equal to a lowest partition number in table $t_2$ such that $P_2$ may be a first active, non-eliminated partition in table $t_2$, and at least one of the partitions in the interval between $P_2-pc_2$ and $P_2-pc_1$ in table $t_1$ may be an active, non-eliminated partition. $P_1$ may be set equal to $P_2-pc_2$. $P_1$ and $P_2$ may be updated during each iteration by finding a lowest partition number $P_2^*$ in table $t_2$ that is greater than or equal to the sum of $P_2+f_2$ such that $P_2^*$ is the first active, non-eliminated partition, and at least one of the partitions in the interval between $P_2^*-pc_2$ and $P_2^*-pc_1$ in table $t_1$ is an active, non-eliminated partition. $P_2$ may be set equal to $P_2^*$, and $P_1$ may be set equal to $P_2^*-pc_2$.

The span of the $f_1$ partitions in table $t_1$ and the span of the $f_2$ partitions in table $t_2$ may be increased as follows. A parameter eps may be set equal to a minimum number of inactive or eliminated partitions in the span of $f_1$ partitions in table $t_1$ beginning at $P_1$ and in the span of $f_2$ partitions of table $t_2$ beginning at $P_2$. Alternatively, the parameters $f_1$ and $f_2$ may be increased if the sum of the inactive partitions in the span of $f_1$ partitions in table $t_1$ beginning at $P_1$ and in the span of $f_2$ partitions of table $t_2$ beginning at $P_2$ is greater than or equal to two; in this case, eps would be this sum divided by two and truncated. The parameters $f_1$ and $f_2$ may be each increased by eps. The parameters $f_1$ and $f_2$ may be further increased if the addition of eps creates extra empty partitions in the increased $f_1$ and $f_2$.

The joining algorithm includes creating a file context, which stores the location data for a row and a first value associated with the row, for each partition of the set of partitions to be joined. The joining algorithm also may determine the lowest first value stored by the file contexts that is equal to or greater than a particular hash value. Finally, the joining algorithm may identify rows with a particular first value by reading the file contexts.

In general, in another aspect, the invention features a computer program, stored in tangible medium, for joining a first table $t_1$ and a second table $t_2$. Each table may contain rows and columns, and each table may be divided into one or more partitions. The computer program comprises executing instructions that may cause a computer to calculate a correlation function between a first correlated value column of table $t_1$ and a second correlated value column of table $t_2$. Following receipt of a query requesting a join between table $t_1$ and table $t_2$, the program may perform a joining algorithm, wherein the partitions containing the rows to be joined may be determined based at least in part upon the correlation function.

The computer program may comprise executing instructions that may cause a computer to calculate, based at least in part upon the correlation function, a first number $f_1$ and a second number $f_2$, wherein $f_1$ and $f_2$ denote the number of partitions of table $t_1$ and table $t_2$, respectively, to be joined. The computer program also may determine based at least in part upon the correlation function, a first starting partition number $P_1$ for table $t_1$ and a second starting partition number $P_2$ for table $t_2$. The program may perform a joining algorithm, wherein a set of $f_2$ partitions of table $t_2$ starting at $P_2$ are joined with a set of $f_1$ partitions of table $t_1$ starting at $P_1$. The algorithm may iterate until all partitions have been subjected to the joining algorithm.

In general, in another aspect, the invention features a system in which a first table $t_1$ may joined with a second table $t_2$. Each table containing rows and columns and is divided into one or more partitions. The system may include a massively parallel processing system comprising one or more nodes, a plurality of CPUs, with each of the one or more nodes providing access to one or more CPUs, and a plurality of processes. Each of the one or more CPUs may provide access to one or more virtual processes. Each process may be configured to manage data, including the partitioned database table, stored in one of a plurality of data-storage facilities. A partitioned table access component may be configured to select rows from the table by calculating a correlation function between a first correlated value column of table $t_1$ and a second correlated value column of table $t_2$, to receive a query requesting a join between table $t_1$ and table $t_2$, and to perform a joining algorithm, wherein the partitions containing the rows to be joined may be determined based at least in part upon the correlation function.

Other features and advantages will become apparent from the description and claims that follow.

DETAILED DESCRIPTION

Figure 1:
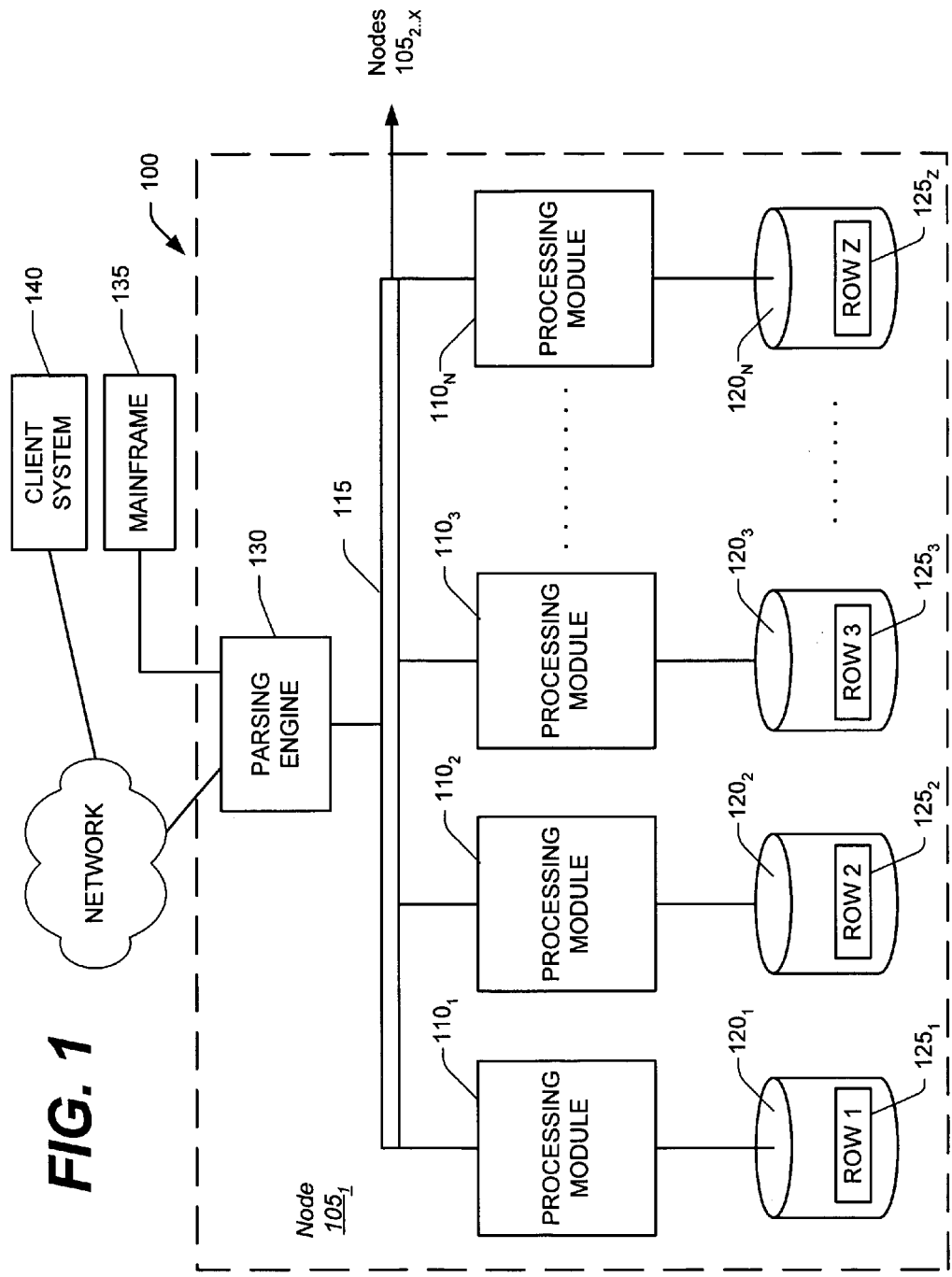
FIG. 1 is a block diagram of a node of a database system.

The partitioned table storage technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps among the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots X}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

The rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
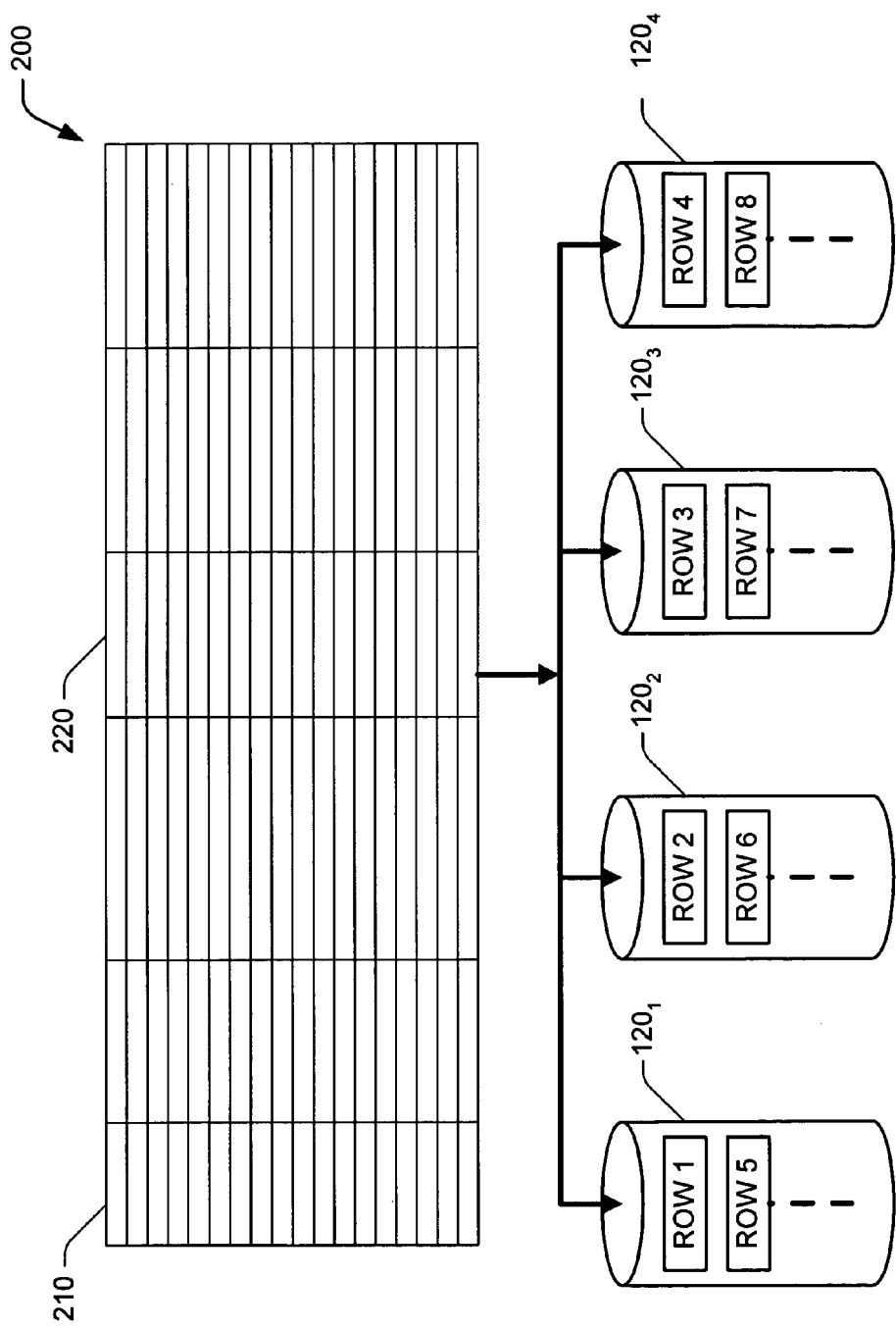
FIG. 2 is a flow diagram of a table distribution process.

FIG. 2 shows one implementation of how the rows of a table are distributed. The table 200 contains a plurality of rows and is stored in a plurality of data storage facilities $120_{1-4}$ by the parsing engine 130, shown in FIG. 1. For example, two columns 210, 220 can be designated as the primary index when the table is created. The hash function is then applied to the contents of columns 210, 220 for each row. The hash bucket portion of the resulting hash value is mapped to one of the data storage facilities $120_{1-4}$ and the row is stored in that facility. For example, if the primary index indicates a column containing a sequential row number and the hash function is the sum of the value one and the remainder when the sequential row number is divided by four, the first eight rows will be distributed as shown in FIG. 2.

Queries involving the values of columns in the primary index can be efficiently executed because the processing module $110_n$ having access to the data storage facility 120, that contains the row can be immediately determined. For example, referring to FIG. 2, if values from row 2 are desired, the parsing engine 130 can apply the hashing function to determine that only processing module $110_2$ needs to be used. As another example, an equality join between two tables that have the same primary index columns is more efficient. All of the rows that need to be joined are found in the same data storage facility $120_n$ and no movement of information from rows between the data storage facilities is necessary.

Figure 3:
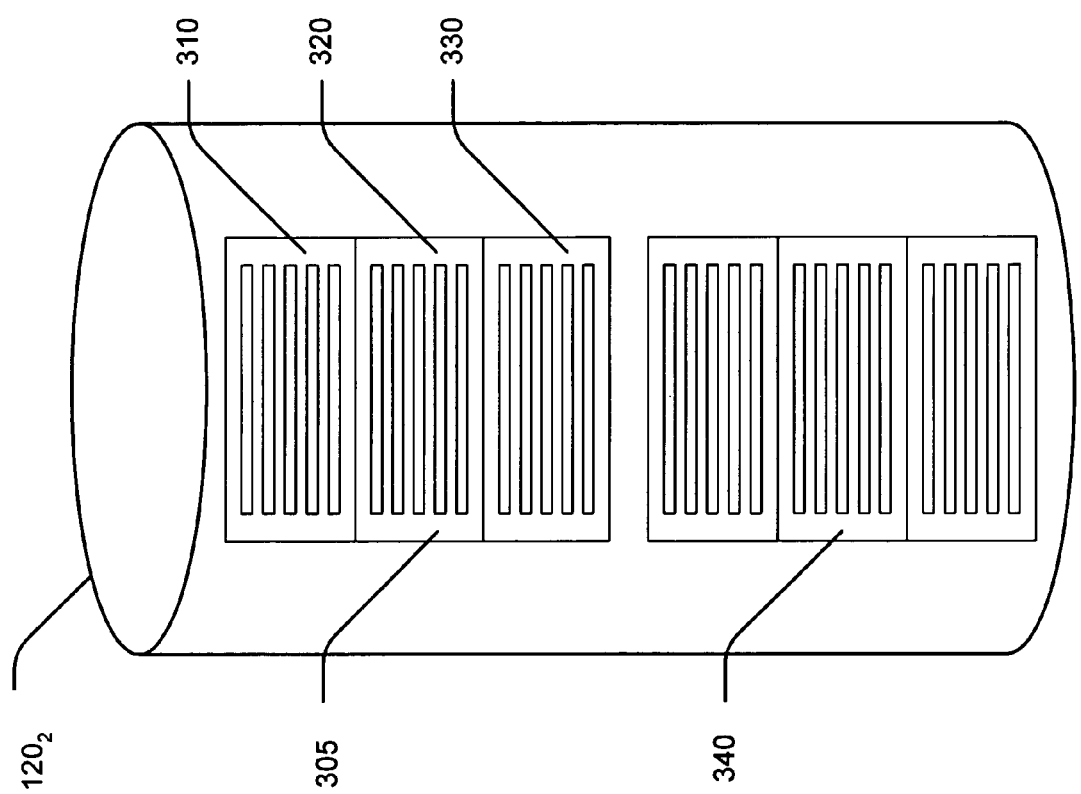
FIG. 3 illustrates an example of rows from two partitioned tables residing in a data storage facility.

While the primary index of a table can be chosen for equality joins, for example the order number column of an order table, additional design features can make range searches, for example a range of dates from the date column, more efficient. Referring to FIG. 3, a partitioned database storage facility $120_2$ is shown. Rows from two partitioned tables 305 and 340 are organized within the storage facility $120_2$ in accordance with a row identification (row ID) that can include values associated with a partition function as well as values associated with the hash function and a uniqueness value. The rows stored in the storage facility $120_2$ are ordered at a top level by the result of the partition function. As a result, a first group of rows 310 has one partition function value. A second group of rows 320 has another partition function value. A third group of rows 330 has a third partition value. The groups 310, 320, 330 are ordered by their partition values and are also known as partitions.

The rows are also ordered within each partition. For example, the first partition 310 contains five rows. Those rows are stored within that partition 310 in the order of the hash result for each row. The hash result therefore acts as a sorting or ordering value. A uniqueness value is also maintained for each row. In one implementation, no two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In another implementation, uniqueness values are not assigned to the rows and the order of rows with identical hash values is not determined.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition 310 could include all rows for orders in January 2001. The second partition 320 could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two-month period is desired, only two partitions would need to be checked for the specified product. The monthly range is just one example of a possible partition function. Any type of function can be used.

For some tables, even though rows within the same hash may occur in each of the partitions of the table, the rows being joined in each table with the same primary index value may occur only in a few partitions. That is, there is a correlation between the partitioning columns (in particular, for range partitioning) for the two tables for any particular value of the primary index columns. An efficient join algorithm can be developed by exploiting this semantic correlation between partitioning columns.

One implementation of a semantic partitioned pair elimination algorithm improves performance under the following conditions: (a) both tables have partitioned primary indexes and are range partitioned on comparable columns (for example, date columns); (b) the join is a join on equality constraints (equi-join, semi-join, etc.); (c) the primary index columns of both tables are the join columns; and (d) the range partitioning columns are correlated as described above.

Figure 4:
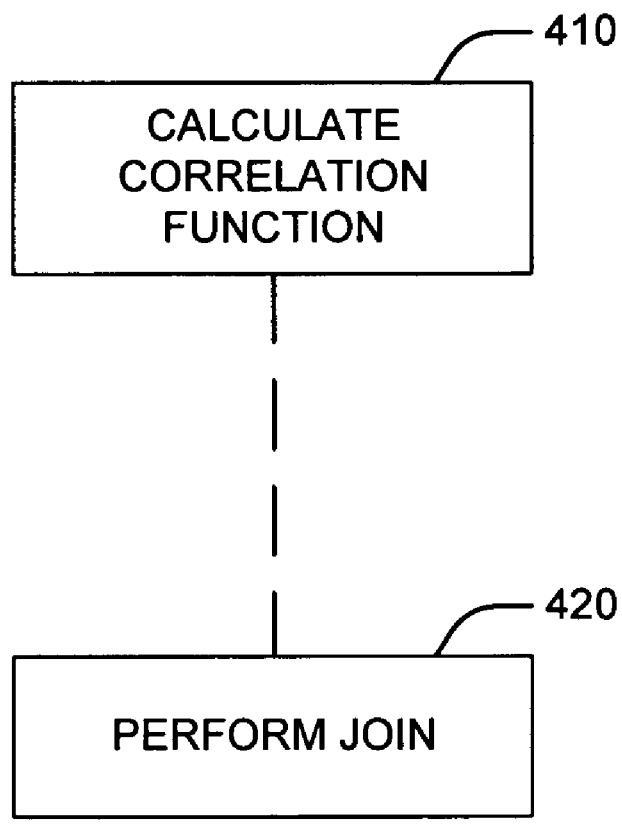
FIG. 4 is a flow chart for the joining of two tables using a correlation function.

A system that performs such an efficient join algorithm, shown in FIG. 4, calculates a semantic correlation function (block 410) and performs a join using that function (block 420).

Semantic Correlation Analysis

Figure 5:
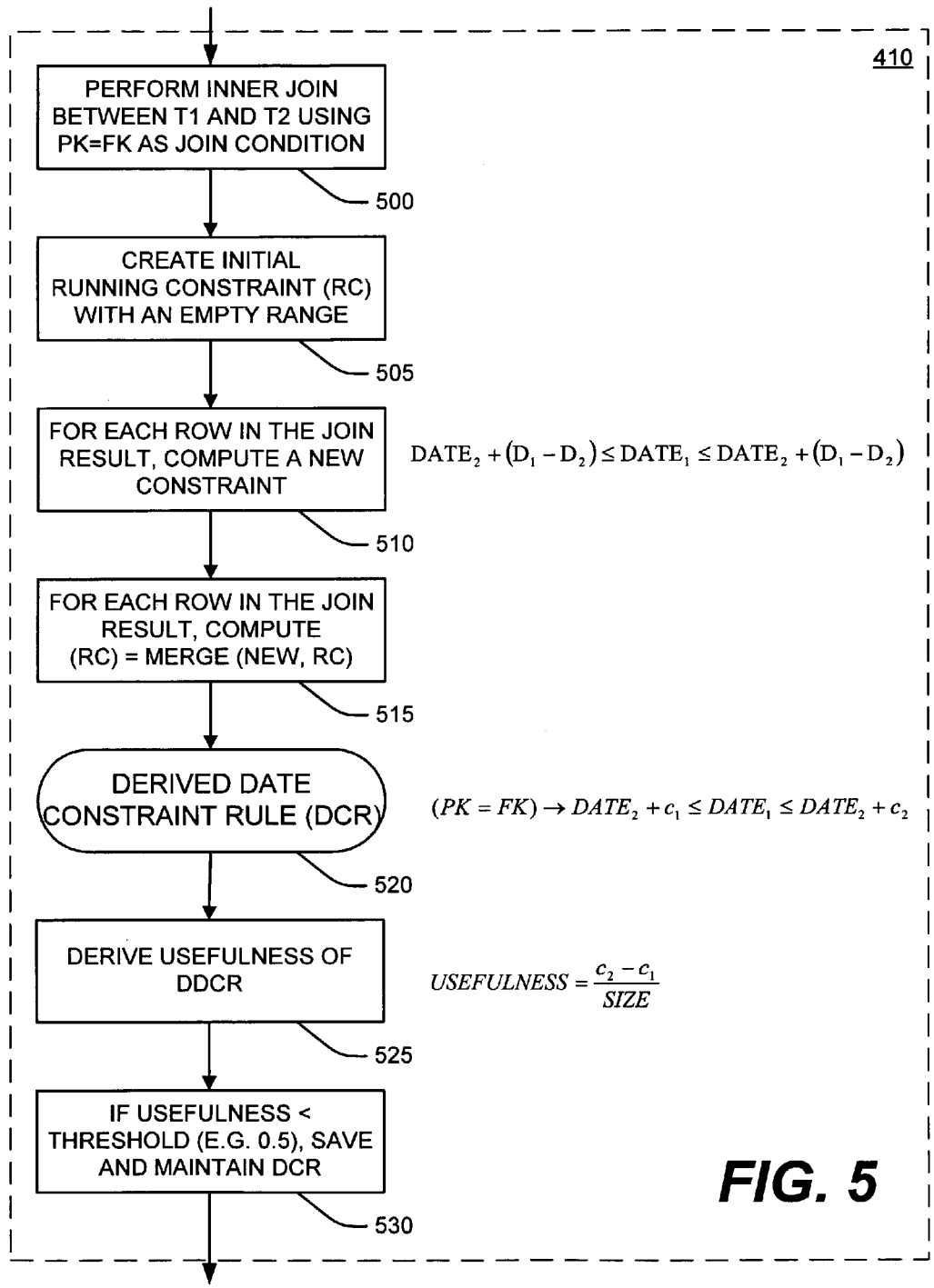
FIG. 5 is a flow chart of an algorithm for calculating a correlation function.

One method of calculating the semantic correlation function of block 410 is shown in FIG. 5. A correlation function can be stated generally as deriving the constants $c_1$ and $c_2$ in the following equation:

$d_1 + c_1 \leq d_2 \leq d_1 + c_2$, where $d_1$ and $d_2$ are values in the range partitioning columns of two tables $t_1$ and $t_2$, respectively.

Assuming the preceding relationship true for all values of the primary index column for some values of $c_1$ and $c_2$ such that $c_2 - c_1$ is not excessively large, i.e., it does not span many range partitions, then there is reasonable correlation between the two tables. A correlation between a primary index value and its partitioning columns, however, is not required.

In one example, it is assumed that two tables, namely ORDERS and LINEITEM, are to be joined. The ORDERS table has a unique primary index of O_ORDERKEY and is range partitioned by O_ORDERDATE (corresponding to $d_1$) with each partition covering one month. The LINEITEM table has a nonunique primary index of L_ORDERKEY and range partitioned by L_SHIPDATE (corresponding to $d_2$) with each partition covering one month. In some queries, these tables may be joined on their primary index columns. For any particular order in the ORDERS table, its order date is less than or equal to any of the ship dates for a line item of the order, and the ship dates occur within a relatively small range of time later than their corresponding order dates. For the disclosed example tables $c_1$ is zero months and $c_2$ is four months, which means that the ship dates for each of the line items is between 0 months and 4 months after the order date: $d_1+0 \leq d_2 \leq d_1+4$ months.

Assume that $t_2$ is the left and larger table (without loss of generality) for the binary join in the following example. Assume that $t_1$ is the right table for the join. The above correlation between t1.d1 and t2.d2 for equal values of the primary index columns can be rewritten as the following:

$$d_2 - c_2 \leq d_1 \leq d_2 - c_1$$

A derived constraint rule (DCR) can typically be represented by the following equation:

$$(PK = FK) \to (Date_2 + c_1 \leq Date_1 \leq Date_2 + c_2),$$

where $c_1$, $c_2$ are constants and $Date_1$ and $Date_2$ are date columns in the PK and FK tables, respectively.

In one example, the optimizer initiates the DCR derivation process when a user issues a collect statistic statements on a date column, e.g., $Date_1$, of a table that is either a primary key (PK) or a foreign key (FK) table and the related table also has a date column, e.g., $Date_2$. The purpose of the correlation algorithm of block 410 is to derive the values of $c_1$ and $c_2$ in the equation above.

The correlation algorithm (block 410) illustrated in FIG. 5, assumes that $t_1$ and $t_2$ are PK–FK tables where $Date_1$ and $Date_2$ are date columns in the PK and FK tables, respectively. It is also assumed, without loss of generality, that both $Date_1$ and $Date_2$ are not nullable.

The process begins by performing an inner join between $t_1$ and $t_2$ using PK=FK as a join condition (block 500). The optimizer will choose the optimal join method. It is not necessary to write the join results to a spool, since the constraint between the two dates will be derived during the implementation of the algorithm.

The algorithm next creates an initial constraint: $Date_2+c_1 \leq Date_1 \leq Date_2+c_2$ where $c_1=+\infty$ and $c_2=-\infty$ (block 505). This constraint is referred to as the initial "running constraint" (RC).

For each row in the join result, the algorithm computes a new constraint (block 510). To compute this new constraint, the values for $Date_1$ and $Date_2$ in $T_1$ and $T_2$, respectively, are $D_1$ and $D_2$, respectively, in the row being analyzed in the join result. Using these values, the constraint $Date_2+(D_1-D_2) \leq Date_1 \leq Date_2+(D_1-D_2)$ is deduced. This new constraint is referred to as NEW.

For each row in the join result, a new RC is computed by merging the old RC with NEW (block 415). For the new RC, c1 is the minimum of c1 of the old RC and $(D_1-D_2)$, and c2 is the maximum of c2 of the old RC and $(D_1-D_2)$. The result (block 520) is a DCR of the following form: $(PK=FK) \to (Date_2+c_1 \leq Date_1 \leq Date_2+c_2)$ (block 520).

To avoid needless imposition of overhead, the "usefulness" of a DCR is analyzed (blocks 525 and 530). Assuming a uniform distribution of $Date_1$ and $Date_2$, a DCR is most useful when $c_1-c_2$ is minimized. Since both $c_1$ and $c_2$ were computed from $Date_1-Date_2$ in the algorithm described above, the range of values for both is from $(Date_1^{MIN}-Date_2^{MAX})$ to $(Date_1^{MAX}-Date_2^{MIN})$, referred to as Low and High, respectively. The usefulness of a DCR is measured as $(c_1-c_2)$/SIZE where SIZE is the interval size for the values of $c_1-c_2$, which is equal to (High−Low+1). The value of the usefulness function is between 0 and 1 with smaller values implying greater usefulness. In one implementation, as a heuristic, the optimizer will save and maintain a DCR only if the usefulness value is less than or equal to 0.5. It will be understood that this threshold could be varied without departing from the spirit of what is disclosed herein. Note that the usefulness function can be extended for non-uniform distribution of one or both of the date columns using collected statistics on those columns. Returning to FIG. 5, once the DCR is computed, the usefulness of the DCR is derived (block 525). If the usefulness of the DCR is less than a threshold, e.g., 0.5, the DCR is saved and maintained (block 530).

Join Analysis

Figure 6:
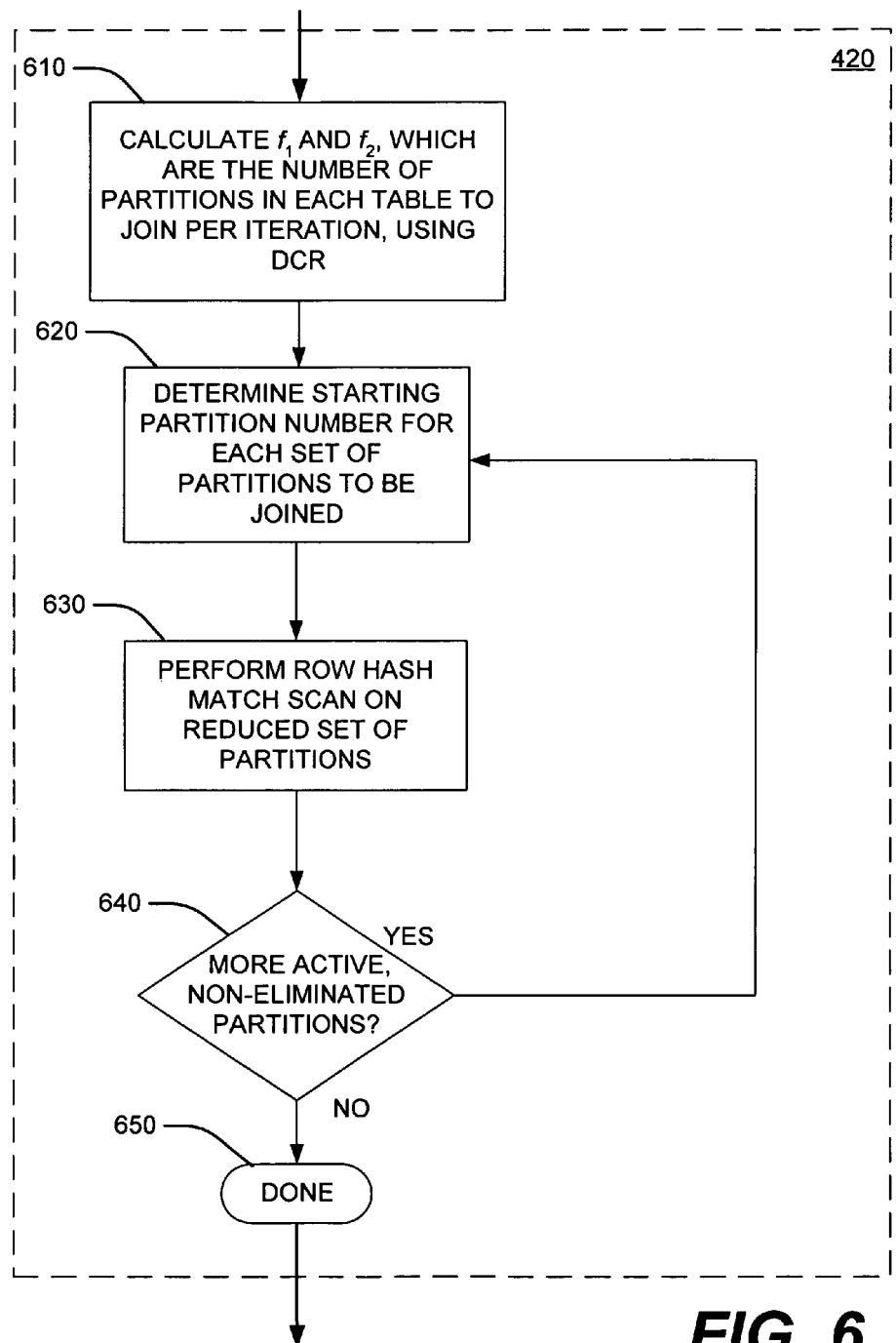
FIG. 6 is a flow chart for an algorithm for joining two partitioned tables.

A semantic query based analysis permits the use of a reduced set of partitions for successive iterations of the join. For example, by deriving the semantic correlation function, the entire table need not be used when performing an iteration of the join; only the semantically-related partitions need be joined. FIG. 6 depicts one implementation of the join of block 420. As shown in FIG. 6, the join may be comprised of multiple steps. First, the parameters $f_1$ and $f_2$ are calculated (block 610), where $f_1$ and $f_2$ denote the number of partitions in table $t_1$ and $t_2$, respectively, that will be processed by the join algorithm in each iteration. Next, starting partition numbers, $P_1$ and $P_2$ for tables $t_1$ and $t_2$, respectively, are determined for the first iteration (block 620). A row hash match scan method algorithm is performed on the rows in a reduced set of partitions comprising $f_2$ partitions beginning at $P_2$ against $f_1$ partitions beginning at $P_1$ (block 630). Finally, the method branches (block 640): if additional semantically-related partitions that are candidates for joining exist, then another set of partitions are joined, otherwise the algorithm concludes (block 650).

Figure 7:
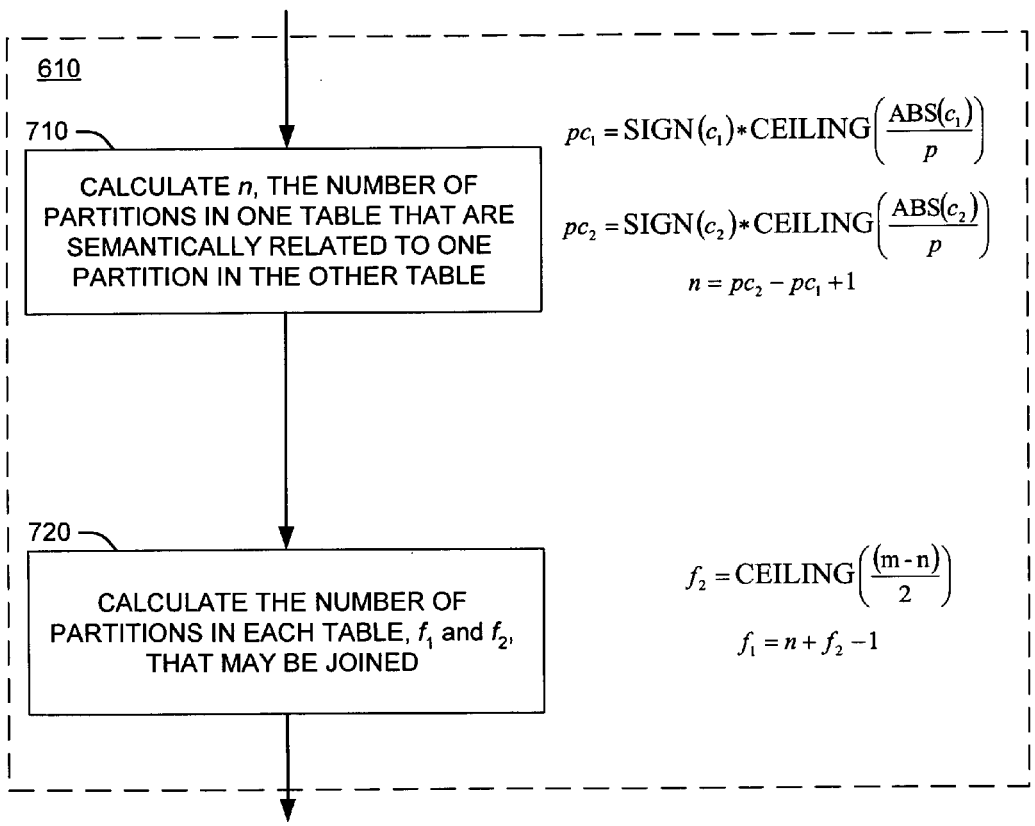
FIG. 7 is a flow chart for an algorithm that calculates the number of partitions in each table that may be joined per iteration.

One way to calculate the number of partitions used in the join algorithm at each iteration (block 610) is shown in FIG. 7. This calculation is a two step process. First, the parameter n, which denotes the number of contiguous partitions in table $t_1$ that may have rows matching a single partition in table $t_2$ is determined (block 710). In such a fashion, the semantic information of the correlated columns is embedded in the parameter n according to the following equations:

$$pc_1 = \text{SIGN}(c_1) * \text{CEILING}\left(\frac{\text{ABS}(c_1)}{p}\right);$$

$$pc_2 = \text{SIGN}(c_2) * \text{CEILING}\left(\frac{\text{ABS}(c_2)}{p}\right); \text{ and}$$

$$n = pc_2 - pc_1 + 1;$$

where the function SIGN returns the value −1 if the argument is less than 0, else it returns the value of 1, CEILING returns the smallest integer greater than or equal to the value of the argument, and ABS returns the absolute value of the argument. In another implementation, the function SIGN could return any value if the argument is zero. Note that the coefficient $pc_1$ is $c_1$ normalized with respect to the partition range size p, and $pc_2$ is $c_2$ normalized with respect to partition range size p. For example, both tables may be partitioned by months, by weeks, or by any other relevant partitioning range. Thus, $pc_1$ and $pc_2$ can be termed partitioning correlation coefficients.

As previously noted, the value n represents the number of contiguous partitions in the right table ($t_1$) that may have rows matching rows in a single partition of the left table ($t_2$). Using the above example based upon an ORDERS table and an LINEITEM table, n is 5 partitions, $pc_2$ is 4, and $pc_1$ is 0.

If n+1 is greater than the parameter m, then another technique is needed to perform the join (such as the general spool, sort, and then do the row hash match scan). Otherwise, the modified direct row hash match scan algorithm is performed. The parameter m is the maximum number of file contexts and associated data blocks reasonable to use for the join without using an excessive amount of memory. The value of m would be determined based on the available memory and number of possible concurrent users. In one implementation, m is set to eight, which is the same value used in that implementation for sort operations that use multiple file contexts (this has been empirically proven to be a reasonable value of m). Each partition used in an iteration has an associated file context. A file context stores at least the location data for a row and a first value associated with the row for each partition that is populated by one or more rows.

The number of partitions joined with a joining algorithm during an iteration is determined by the semantic relationship between one partition in table $t_2$ and a set of partitions in table $t_1$, and by the maximum amount of memory available for file context storage. The following equations illustrate one way to calculate the parameters $f_1$ and $f_2$ (block 720) assuming a partition range of size p for both tables:

$$f_2 = \text{CEILING}\left(\frac{(m-n)}{2}\right); \text{ and}$$

$$f_1 = n + f_2 - 1.$$

By calculating $f_1$ and $f_2$ in this fashion, at least one file context is allocated to the left table ($t_2$), and at least n file contexts are allocated to the right table ($t_1$). Any excess file contexts (up to the maximum of m−n−1) are divided evenly between the two tables.

Once the number of partitions of each table to be joined is determined (block 610), the starting partition numbers are calculated (block 620). In one implementation $P_1$ denotes the first partition in a set of $f_1$ partitions in table $t_1$ and $P_2$ denotes the first partition in a set of $f_2$ partitions in table $t_2$. $P_2$ is chosen to be the first active, non-eliminated partition in table $t_2$ such that at least one of the partitions in the range $P_2-pc_2$ to $P_2-pc_1$ in table $t_1$ is an active, non-eliminated partition. $P_1$ is then set to $P_2-pc_2$. An active, non-eliminated partition is a partition that contains at least one row and for which constraints in the query have not specified that this partition does not need to be searched (for instance, conditions on the partitioning columns may allow the optimizer to determine that some partitions can be eliminated from the join).

Figure 8:
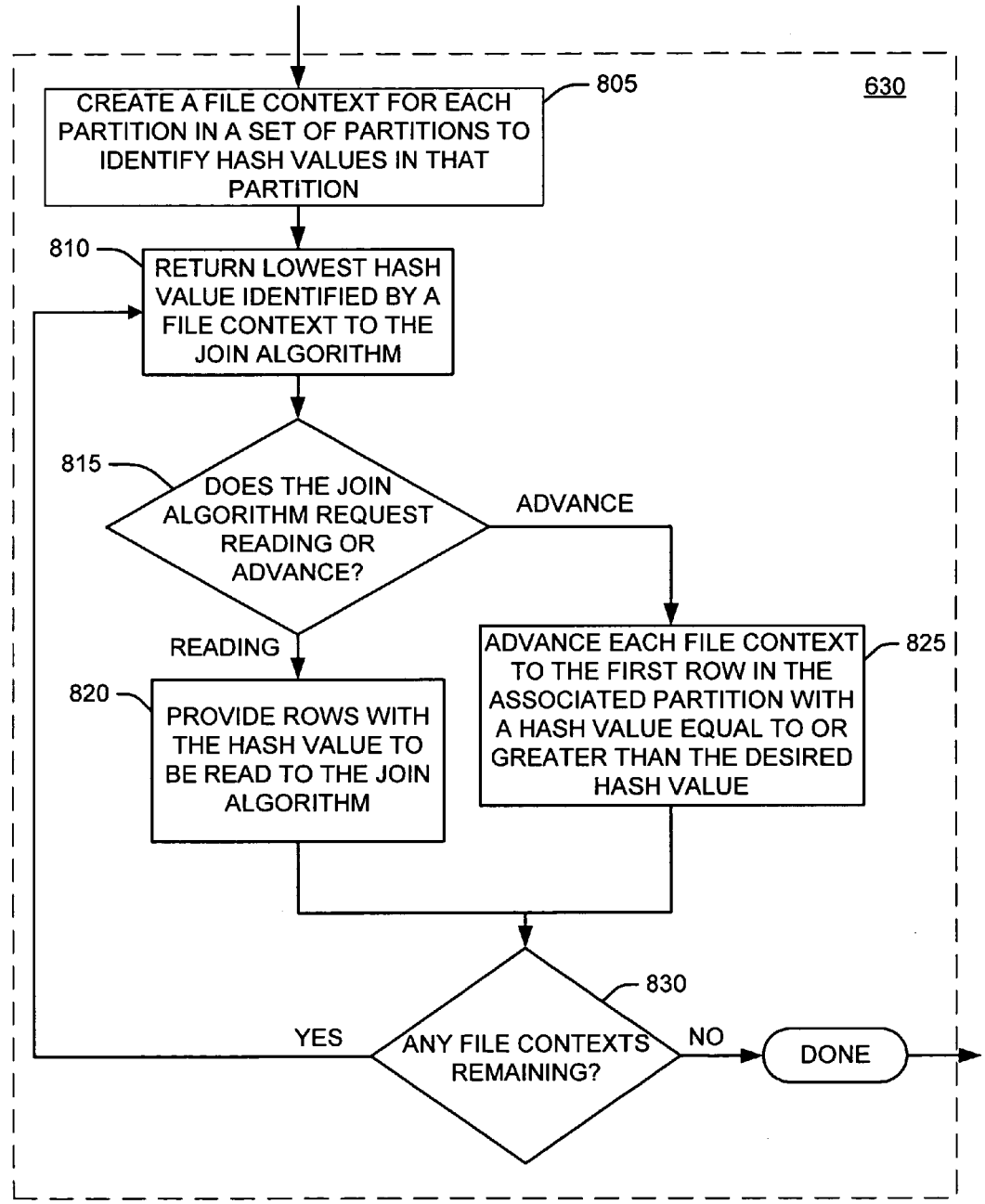
FIG. 8 is a flow chart of an algorithm for selecting rows from a set of partitions.

Following a determination of the actual span of partitions in each table to be joined during each iteration (e.g., both the starting partition number and the number of partitions in each table to be joined are calculated), the join algorithm may be performed (block 630). As depicted in FIG. 8, one implementation of a process for selecting rows by hash value from a set of partitions for a row hash match scan algorithm includes several steps. The process can be used on both sets of partitions. First, the process creates a file context for each partition in each set of partitions specified in the join command to track hash values in that partition (block 805) (more particularly described with respect to FIG. 9). The process then determines the lowest hash value identified by the file contexts for the set of partitions and provides that value to the join algorithm (block 810). The join algorithm requests a reading of a hash value or an advance to a hash value (block 815). If the join algorithm requests a reading, rows in the set of partitions with that hash value are provided to the algorithm (block 820) (more particularly described with respect to FIG. 10). If the join algorithm requests an advance, each file context for the set of partitions is modified, if necessary, to identify the first row with the desired hash value or a greater hash value (block 825) (more particularly described with respect to FIG. 11). If file contexts remain (block 830), the lowest identified hash value is again provided to the join algorithm (block 810). If no file contexts remain (block 830), the process of selecting rows is finished. In one implementation, the join algorithm receives a signal indicating that the set of partitions has no rows with hash values equal to or greater than the last requested hash value.

Figure 9:
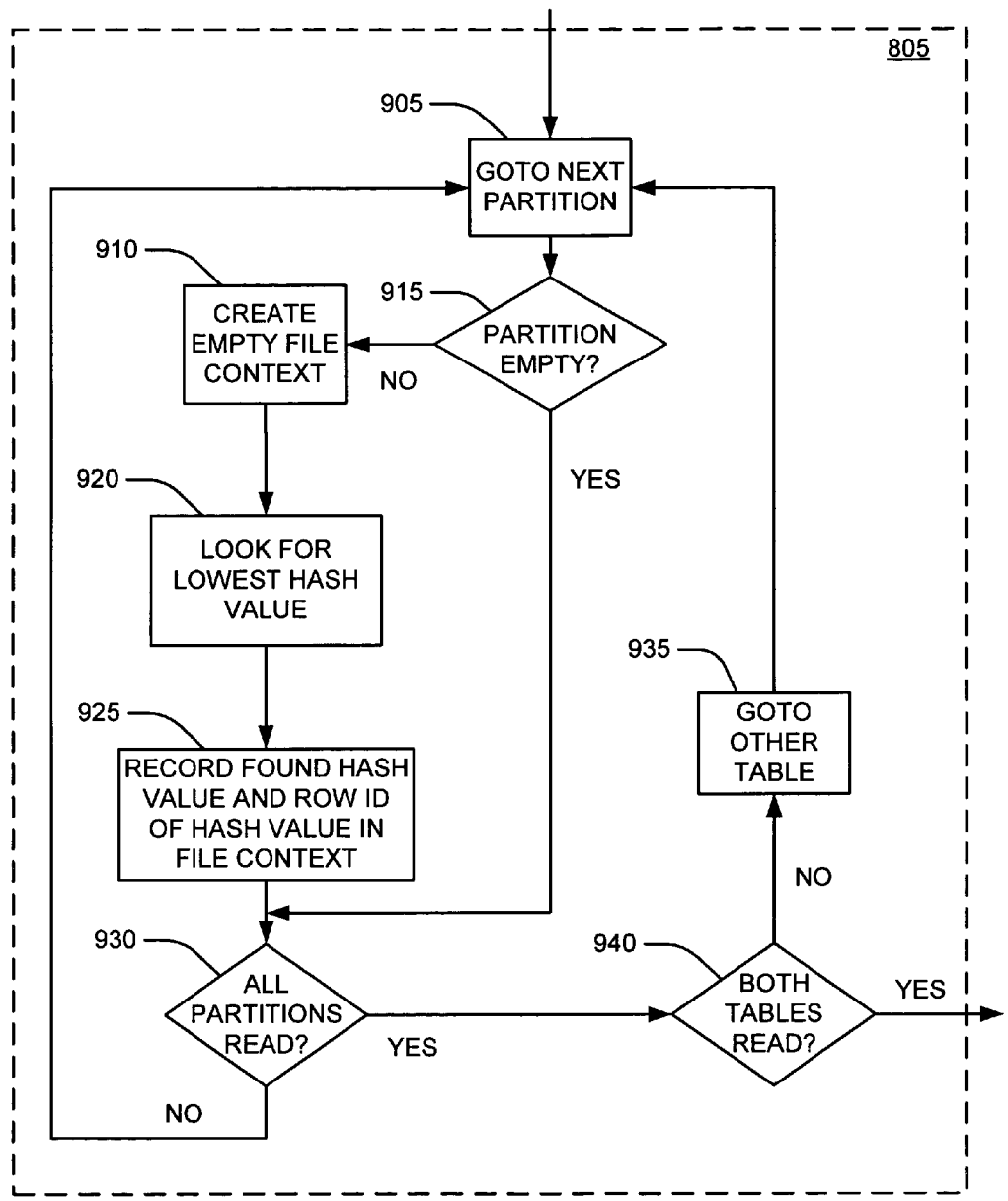
FIG. 9 is a flow chart of an algorithm for creating a file context for each partition in two sets of partitions.

One implementation of the process of creating file contexts for each partition is depicted in FIG. 9 and involves examining the next partition (or the first partition at the very beginning of the process) in a set of partitions (block 905). If that partition is empty (block 915) and unexamined partitions still exist in the set (block 930), the next partition (block 905) is checked to see if it contains rows (block 915). If that partition is populated with one or more rows (block 915), an empty file context for that partition is created (block 910). The associated partition is then examined to find the row containing that partition's lowest hash value or, in another implementation, to find the row containing that partition's lowest hash value greater than or equal to a given hash value (block 920). Once a value meeting the criteria is found in a row in the partition, location information for that row, as well as the hash value itself, are stored in that partition's file context (block 925). In one implementation, the file context is not created until the initial location data and hash value for it are determined. If unexamined partitions still exist in the table (block 930), the next partition is examined (block 905), and the process is repeated. If all partitions in the set have been examined, the partitions in the set in the other table are examined (block 935). When all partitions in all specified sets of partitions have been examined, the process of creating file contexts is complete.

In one specific implementation, the process of creating file contexts entails, first, an empty file context is created and the file system is requested to find a first data block with a hash value equal to or higher than 'hhhhhhhh' (hexadecimal notation) ignoring one or more high-order bytes that designate the partition. The value 'hhhhhhhh' is the desired starting hash value or '00000000' if it is desired to find the first hash value in the table. The join algorithm picks one of the two tables/spools in the join and finds its lowest hash value; then using that hash value, probes into the other table/spool. The file system positions to the first data block containing a row with equal or higher hash value than the desired hash value, reads that data block and then positions to the first row in that data block with an equal or higher value than the desired hash value. Another empty file context is created. The file system is requested to find the next row using that file context with a hash value equal to or higher than 'hhhhhhhh' in a partition that is at least one higher than the partition number in the row identification (row ID) of the first row found. This is continued until no row is found creating as many file contexts as needed in the process. The file contexts are linked together so that the file contexts can easily be traversed.

Referring again to FIG. 8, the lowest hash value of the new file contexts for a set of partitions is determined. In one implementation of this step, the hash value in the first file context for the set is examined and stored as the "lowest" hash value. Then, the hash value in the next file context for that table is examined, and if this new value is smaller than the "lowest" hash value, the new value is stored as the "lowest" hash value. That step is repeated until every file context has been examined, at which point the "lowest" hash value has been determined.

Figure 10:
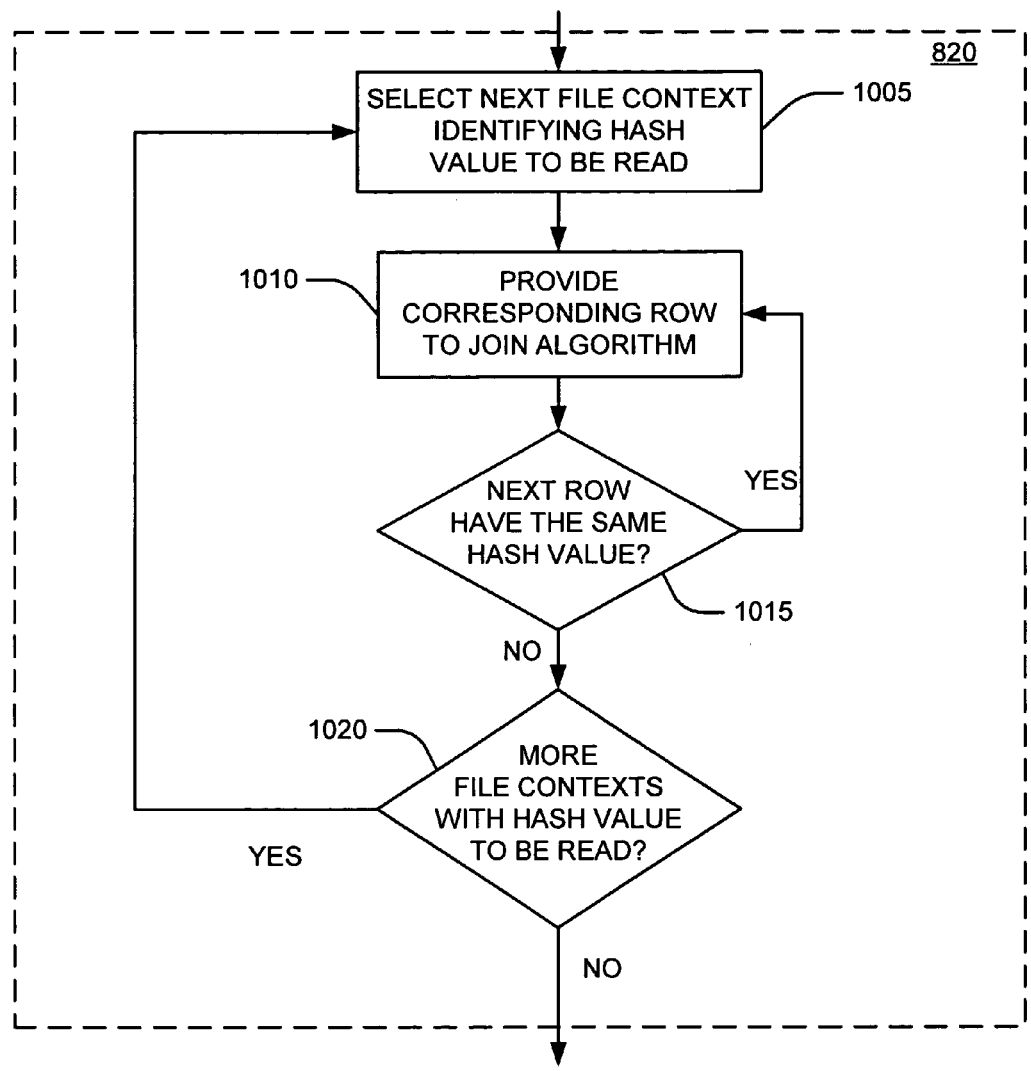
FIG. 10 is a flow chart of an algorithm for providing rows with a particular hash value.

As depicted in FIG. 8, the join algorithm can request that rows having a particular hash value be read from a set of partitions. One implementation for reading rows is depicted in FIG. 10 and begins with selecting the next partition (or the first partition at the very beginning of the process) that identifies the hash value to be read (block 1005). The stored location data is used to provide the row data to the join algorithm (block 1010). The next row in the partition is then checked to see if it has the same hash value (block 1015). If it does, its data is also provided to the join algorithm. Those two steps continue until a row with a different hash value is located or no more rows are in the partition. If more file contexts identifying the hash value to be read remain (block 1020), rows are provided using the data in those file contexts (block 1005). If not, all the rows have been provided. In one case, the join algorithm can request that rows with the same hash value be read again. For example, insufficient available memory requires that if there are many rows with the same hash value, they are compared piecemeal with rows loaded into memory in partial sets.

Figure 11:
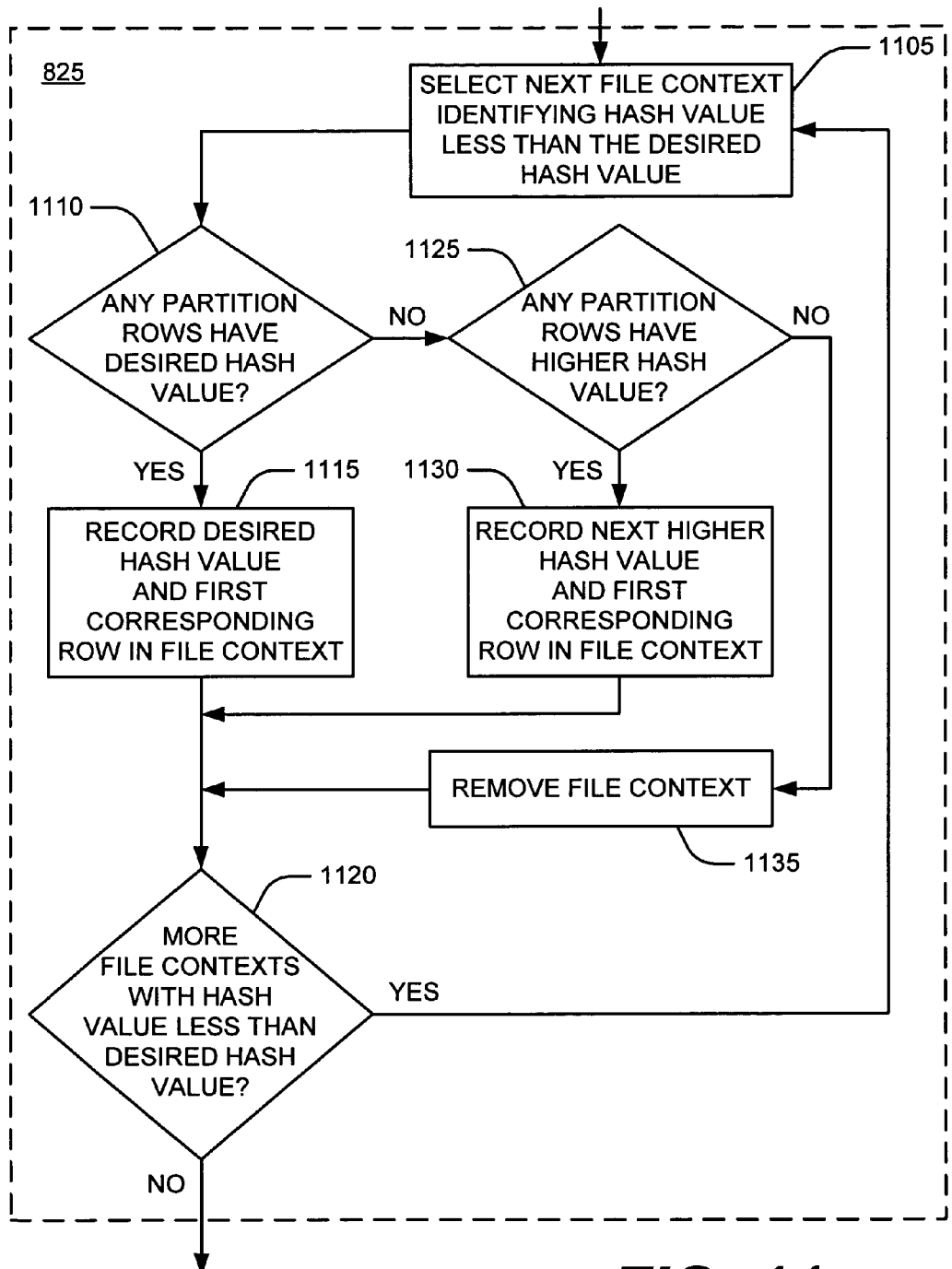
FIG. 11 is a flow chart of an algorithm for updating the file contexts.

FIG. 11 depicts one implementation of the process of advancing each file context to the first row in the associated partition that has a hash value greater than or equal to a desired hash value (block 825). The implementation begins with selecting the next partition (or the first partition at the very beginning of the process) that identifies a hash value less than the desired value (block 1105). If a partition identifies a hash value greater than or equal to the desired hash value, it does not need to be advanced, though in some implementations it could be (for instance, if residual conditions indicate that the found row is not applicable). Once a file context with a lesser hash value is identified, the rows in the associated partition are examined for the desired hash value (block 1110). If one or more such rows exist, the hash value and location data for the first such row is recorded in the file context (block 1115). If not, the rows in the associated partition are examined for a hash value greater than the desired hash value (block 1125). If one or more such rows exist, the hash value and location data for the first such row is recorded in the file context (block 1130). If no rows with hash values greater than or equal to the desired hash value are present in the partition, the file context is removed (block 1135). The remaining file contexts are then examined for identified hash values less than the desired hash value (block 1120) and the process repeats for any such file contexts.

By performing a row hash match scan algorithm, the rows are presented to the join algorithm in hash order skipping any rows with hash values not needed by the join algorithm. The join algorithm, therefore, sees the rows as if all rows were ordered by the row hash instead of being partitioned. Reading the rows in this fashion requires additional memory to contain the multiple contexts and associated data blocks. Additional CPU is needed to manage the multiple file contexts. The number of I/Os, however, should be approximately the same as when using a traditional primary index and the CPU time should be dominated by the join algorithm itself. The performance should only be slightly less than with a traditional primary index.

Partition Advancing Algorithm

Following a join between the semantically related partitions in each table, the algorithm performs another iteration (block 640) if an active, non-eliminated partition that has not been included in a previous set of partitions exists. In one implementation, a new set of partitions in each table are identified for joining. Referring back to FIG. 6, a starting partition number for each set of partitions must be determined for each iteration (block 620). In one implementation (assuming that $P_1$ and $P_2$ are the starting partition numbers in the previous implementation), $P_2^*$, a starting partition number for table $t_2$ in the next iteration is chosen to be the first active, non-eliminated partition at $P_2$ or higher in table $t_2$ such that at least one of the partitions between $P_2^*-pc_2$ and $P_2^*-pc_1$, inclusively, in table $t_1$ is an active, non-eliminated partition. The starting partition number, $P_1^*$, for table $t_1$ in the next iteration is then chosen to be $P_2^*-pc_2$.

Figure 12A:
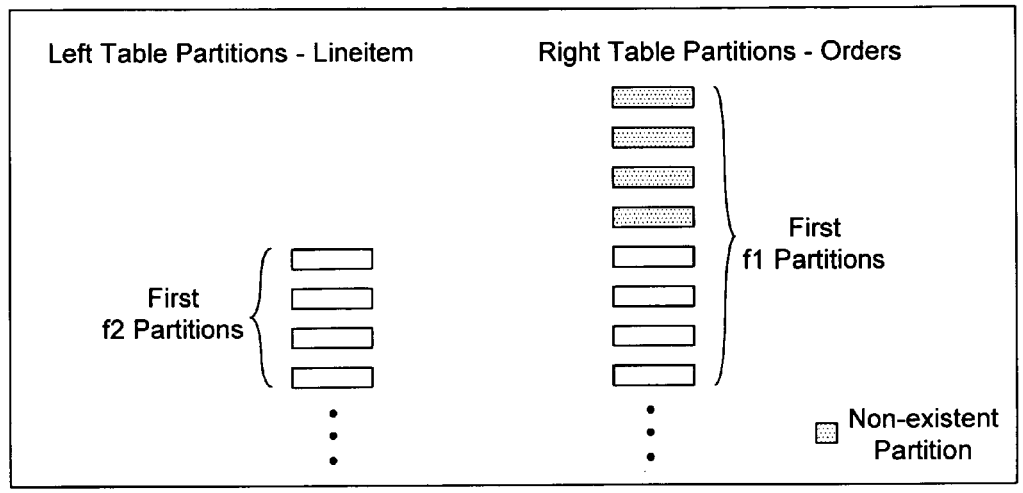
FIGS. 12A, 12B, and 12C illustrate one implementation of an advancing algorithm based upon correlation analysis of two tables to be joined.

FIG. 12 illustrates one implementation of the advancing algorithm of block 620. FIG. 12A illustrates the initial configuration of one implementation. The following assumptions for this example are made in FIG. 12: the left table is LINEITEM and the right table is ORDERS; $c_1=0$ months and $c_2=4$ months for the semantic correlation between O_ORDERDATE and L_SHIPDATE; m=12; n=5, $f_2=4$, and $f_1=8$. In this implementation, the initial subset of partitions for ORDERS covers non-existent partitions. Additionally this example illustrates that some partitions in table $t_1$ may be non-existent during the initial iteration of the method. Furthermore, some of the $f_2$ partitions at the end of $t_2$ may be non-existent as well.

Figure 12B:
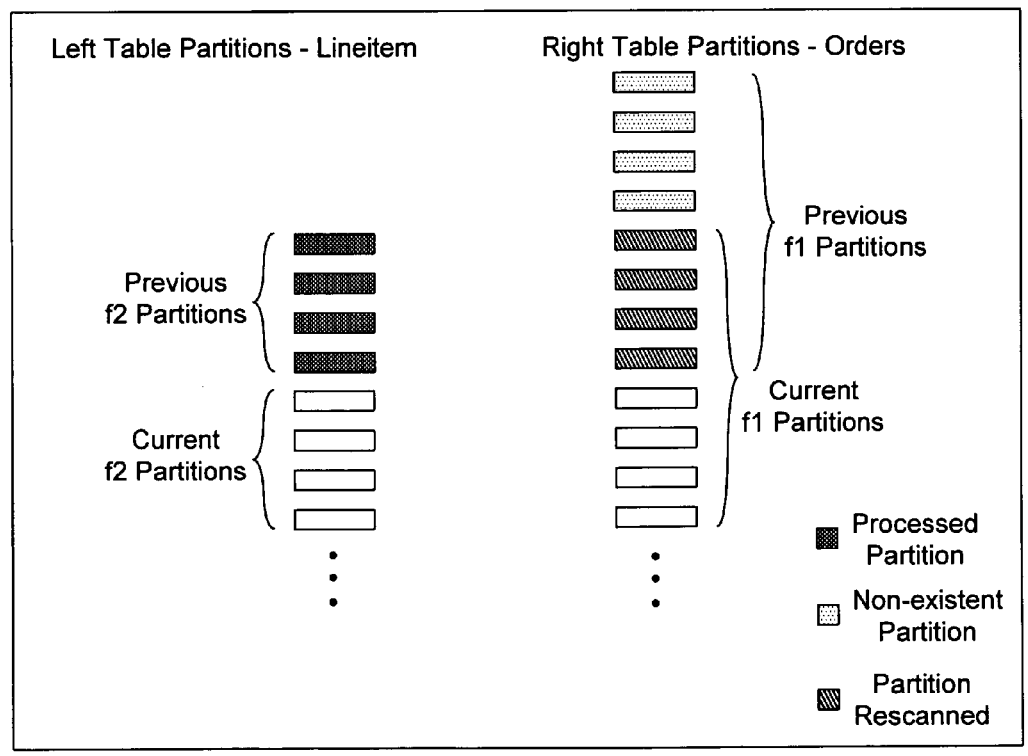

FIG. 12B illustrates the result of advancing to the next set of partitions. Here, it is assumed that the next partition in the left table $t_1$ is a non-eliminated partition that contains data rows. If the next partition is eliminated or does not contain data rows, then the method merely goes to the first partition that contains data rows. The current $f_2$ partitions on the left table of FIG. 12B are joined with the corresponding current $f_1$ partitions on the right table $t_1$ of FIG. 12B using the join method of block 630.

Figure 12C:
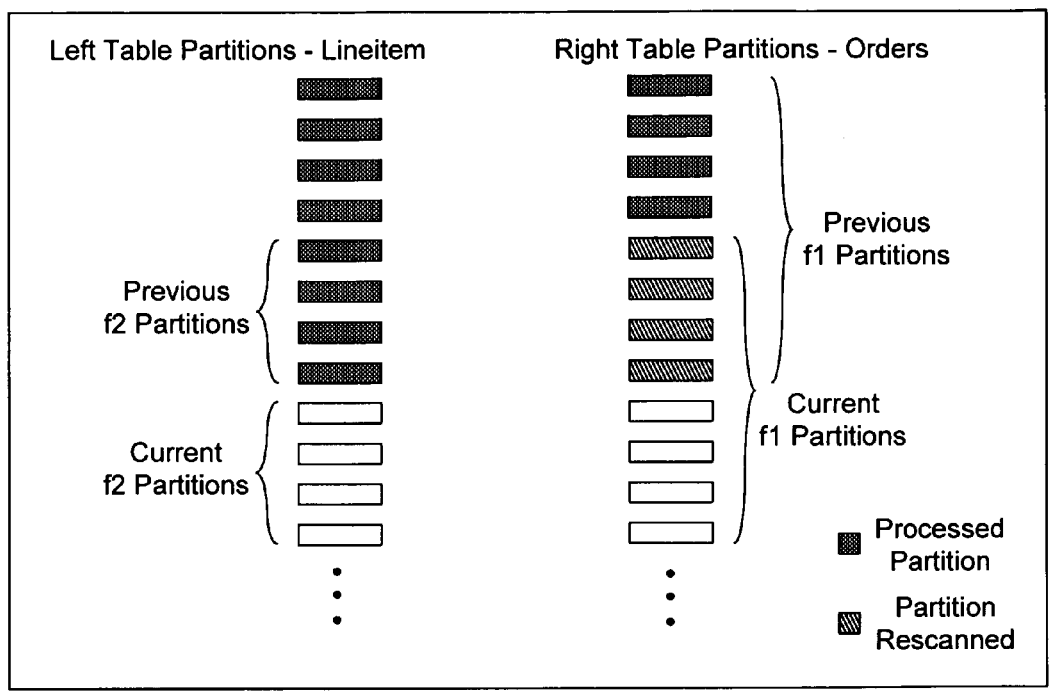

FIG. 12C illustrates the advancement to the third and subsequent set of partitions. Here it is assumed that the next partition in the left table contains rows (otherwise just skip to the first partition that does) and has not been eliminated. The current $f_2$ partitions on the left are joined to the corresponding current $f_1$ partitions on the right using the join method of block 630.

The number of partitions spanned in the left and right table may be increased when the partitions are inactive or eliminated. More particularly, whenever there are initially two or more empty file contexts the span may be increased. In one implementation, the number of partitions spanned in the left and right table when the partitions are inactive or eliminated may be increased for an iteration. That is, the $f_1$ and $f_2$ can be increased for each table by a parameter eps, which is the minimum of the number of inactive or eliminated partitions in the current span on the right table ($t_1$) and the corresponding value for the left table ($t_2$) to define a $f_1'$ and $f_2'$ for this iteration. If the span is increased, this can be repeated for additional partitions added to the span. In this fashion, there will be a total of $f_1'+f_2'$ partitions processed by the join algorithm for this iteration.

In another example, the number of partitions in the span can be increased based upon the number of the inactive or eliminated partitions in the current span on the right table ($t_1$) and on the left table ($t_2$) according to the following equation:

$$\mathrm{FLOOR}\left(\frac{x}{2}\right),$$

where x is the sum of the number of inactive or eliminated partitions in the span of $f_1$ partitions of table $t_1$ beginning at $P_1$ and in the span of $f_2$ partitions of table $t_2$ beginning at $P_2$, and FLOOR returns the largest integer less than or equal to the value of the argument. If the span is increased, this can be repeated for additional partitions added to the span. In this fashion, there will be a total of $f_1'+f_2'$ partitions processed by the join algorithm for this iteration.

The text above described one or more specific implementations of a broader invention. The invention also is carried out in a variety of alternative implementations and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. As another example, an implementation has been described with the sorting value as a hash value that is also used for distributing rows among storage facilities. Other types of sorting values are also useful in carrying out the invention. Many other implementations are also within the scope of the following claims.

We claim:

1. A method of joining a first table $t_1$ and a second table $t_2$, each table containing rows and columns and being divided into one or more partitions, the method including:
   (a) calculating a correlation function between a first correlated value column of table $t_1$ and a second correlated value column of table $t_2$;
   (b) receiving a query requesting a join between table $t_1$ and table $t_2$; and
   (c) performing a joining algorithm, wherein the partitions containing the rows to be joined are determined based at least in part upon the correlation function,
   wherein the joining algorithm comprises:
   (c1) calculating, based at least in part upon the correlation function, a first number $f_1$ and a second number $f_2$, wherein $f_1$ and $f_2$ denote the number of partitions of table $t_1$ and table $t_2$, respectively, to be joined;
   (c2) determining, based at least in part upon the correlation function, a first starting partition number $P_1$ for table $t_1$ and a second starting partition number $P_2$ for table $t_2$;
   (c3) joining a set of $f_2$ partitions of table $t_2$ starting at $P_2$ with a set of $f_1$ partitions of table $t_1$ starting at $P_1$;
   (c4) updating $P_1$ and $P_2$.

2. The method of claim 1, wherein (c3) and (c4) are repeated while at least one table has at least one active, non-eliminated partition.

3. The method of claim 1, wherein the $f_2$ partitions to be joined in (c3) are contiguous.

4. The method of claim 1, wherein the $f_1$ partitions to be joined in (c3) are contiguous.

5. The method of claim 1, wherein the $f_2$ partitions to be joined in (c3) are not contiguous.

6. The method of claim 1, wherein the $f_1$ partitions to be joined in (c3) are not contiguous.

7. The method of claim 1, wherein the span of the $f_1$ partitions in table $t_1$ and the span of the $f_2$ partitions in table $t_2$ to be joined in (c3) are increased, the method further comprises:
   (c31) setting a parameter eps equal to the minimum number of inactive or eliminated partitions in (i) the span of $f_1$ partitions in table $t_1$ beginning at $P_1$ and in (ii) the span of $f_2$ partitions of table $t_2$ beginning at $P_2$;
   (c32) increasing the value of $f_2$ by eps;
   (c33) increasing the value of $f_1$ by eps; and
   (c34) after performing (c4), resetting the value of $f_2$ equal to the value of $f_2$ calculated in (c1) and resetting the value of $f_1$ equal to the value of $f_1$ calculated in (c1).

8. The method of claim 7, wherein (c31), (c32), and (c33) are repeated if some of the partitions added in the preceding iteration of (c31), (c32), and (c33) are empty.

9. The method of claim 1, wherein the span of the $f_1$ partitions in table $t_1$ and the span of the $f_2$ partitions in table $t_2$ to be joined in (c3) is increased, the method further comprises:
   (c31) setting a parameter eps equal to the result of the function FLOOR(x/2), wherein x is a sum of the number of inactive or eliminated partitions in the span of $f_1$ partitions in table $t_1$ beginning at $P_1$ and the span of $f_2$ partitions in table $t_2$ beginning at $P_2$, and FLOOR (x/2) returns a largest integer that is less than or equal to x/2;
   (c32) increasing the value of $f_2$ by eps;
   (c33) increasing the value of $f_1$ by eps; and
   (c34) after performing (c4), resetting the value of $f_2$ equal to the value of $f_2$ calculated in (c1) and resetting the value of $f_1$ equal to the value of $f_1$ calculated in (c1).

10. The method of claim 9, wherein (c31), (c32), and (c33) are repeated if some of the partitions added in the preceding iteration of (c31), (c32), and (c33) are empty.

11. A method of joining a first table $t_1$ and a second table $t_2$, each table containing rows and columns and being divided into one or more partitions the method including:
   (a) calculating a correlation function between a first correlated value column of table $t_1$ and a second correlated value column of table $t_2$;
   (b) receiving a query requesting a join between table $t_1$ and table $t_2$; and
   (c) performing a joining algorithm, wherein the partitions containing the rows to be joined are determined based at least in part upon the correlation function,
   wherein calculating the correlation function includes:
   joining table $t_1$ to table $t_2$ using PK=FK as the join condition to produce a join result having rows, each row including a value from $cv_1$ and a value from $cv_2$, wherein PK denotes a primary key column in table $t_1$, FK denotes a foreign key column in table $t_2$, $cv_1$ denotes a first correlated value column in table $t_1$ and $cv_2$, denotes a second correlated value column in table $t_2$;

creating an initial running constraint (RC), the initial running constraint comprising a null range; and producing a derived constraint rule (DCR) having the following form:

$$(PK = FK) \to cv_2 + c_1 \leq cv_1 \leq cv_2 + c_2,$$

where $c_1$ and $c_2$ are constants, and "$\to$" means "implies;"

by performing the following processing for each row in the join result:

computing a new constraint (NEW), having a range; and modifying RC by merging the range of NEW with the range of RC.

12. The method of claim 11, wherein the joining algorithm comprises:

(c1) calculating, based at least in part upon the correlation function, a first number $f_1$ and a second number $f_2$, wherein $f_1$ and $f_2$ denote the number of partitions of table $t_1$ and table $t_2$, respectively, to be joined, wherein:

p is set equal to a size of a partition range of table $t_1$ and table $t_2$;

$pc_1$ is set equal to the value of $(SIGN(c_1)*CEILING(ABS(c_1)/p))$, wherein $SIGN(c_1)$ returns a value of $-1$ if $c_1$ is less than zero, otherwise $SIGN(c_1)$ returns a value of 1, $ABS(c_1)$ returns an absolute value of $c_1$, and $CEILING(ABS(c_1)/p)$ returns a smallest integer that is not less than the value of $ABS(c_1)/p$;

$pc_2$ is set equal to the value of $(SIGN(c_2)*CEILING(ABS(c_2)/p))$, wherein $SIGN(c_2)$ returns a value of $-1$ if $c_2$ is less than zero, otherwise $SIGN(c_2)$ returns a value of 1, $ABS(c_2)$ returns an absolute value of $c_2$, and $CEILING(ABS(c_2)/p)$ returns a smallest integer that is not less than the value of $ABS(c_2)/p$;

n is set equal to $pc_2-pc_1+1$, wherein n is a number of contiguous partitions in table $t_1$ that may have rows matching rows in a single partition of table $t_2$;

m is a maximum number of file contexts;

$f_2$ is set equal to the smallest integer value that is equal to or greater than the value of $((m-n)/2)$;

$f_1$ is set equal to $n+f_2-1$;

(c2) determining, based at least in part upon the correlation function, a first starting partition number $P_1$ for table $t_1$ and a second starting partition number $P_2$ for table $t_2$, wherein:

$P_2$ is set equal to a lowest partition number in table $t_2$ such that $P_2$ is a first active, non-eliminated partition in table $t_2$, and at least one of the partitions in the interval between $P_2-pc_2$ and $P_2-pc_1$ in table $t_1$ is an active, non-eliminated partition;

$P_1$ is set equal to $P_2-pc_2$;

(c3) joining a set of $f_2$ partitions of table $t_2$ starting at $P_2$ with a set of $f_1$ partitions of table $t_1$ starting at $P_1$;

(c4) updating $P_1$ and $P_2$, wherein:

$P_2$ is set equal to a lowest partition number $P_2^*$ in table $t_2$, wherein:

the lowest partition number $P_2^*$ is greater than or equal to the sum of $P_2+f_2$;

$P_2^*$ is a first active, non-eliminated partition;

at least one of the partitions in the interval between $P_2^*-pc_2$ and $P_2^*-pc_1$ in table $t_1$ is an active, non-eliminated partition; and $P_1$ is set equal to $P_2^*-pc_2$.

13. The method of claim 12, wherein (c3) and (c4) are repeated while at least one table has at least one active, non-eliminated partition.

14. A method of joining a first table $t_1$ and a second table $t_2$, each table containing rows and columns and being divided into one or more partitions, the method including:

(a) calculating a correlation function between a first correlated value column of table $t_1$ and a second correlated value column of table $t_2$, wherein calculating the correlation function includes:

joining table $t_1$ to table $t_2$ using PK=FK as the join condition to produce a join result having rows, each row including a value from $cv_1$ and a value from $cv_2$, wherein PK denotes a primary key column in table $t_1$, FK denotes a foreign key column in table $t_2$, $cv_1$ denotes a first correlated value column in table $t_1$, and $cv_2$, denotes a second correlated value column in table $t_2$;

creating an initial running constraint (RC), the initial running constraint comprising a null range;

producing a derived constraint rule (DCR) having the following form:

$$(PK = FK) \to cv_2 + c_1 \leq cv_1 \leq cv_2 + c_2,$$

where $c_1$ and $c_2$ are constants, and "$\to$" means "implies;"

by performing the following processing for each row in the join result:

computing a new constraint (NEW), having a range; and modifying RC by merging the range of NEW with the range of RC;

setting p equal to a size of a partition range of table $t_1$ and table $t_2$;

determining a first correlation coefficient $pc_1$ which is equal to the value of $(SIGN(c_1)*CEILING(ABS(c_1)/p))$, wherein $SIGN(c_1)$ returns a value of $-1$ if $c_1$ is less than zero, otherwise $SIGN(c_1)$ returns a value of 1, $ABS(c_1)$ returns the absolute value of $c_1$, and $CEILING(ABS(c_1)/p)$ returns a smallest integer that is equal to or greater than $ABS(c_1)/p$;

determining a second correlation coefficient $pc_2$ which is equal to the value of $(SIGN(c_2)*CEILING(ABS(c_2)/p))$, wherein $SIGN(c_2)$ returns a value of $-1$ if $c_2$ is less than zero, otherwise $SIGN(c_2)$ returns a value of 1, $ABS(c_2)$ returns the absolute value of $c_2$, and $CEILING(ABS(c_2)/p)$ returns a smallest integer that is equal to or greater than $ABS(c_2)/p$;

(b) receiving a query requesting a join between table $t_1$ and table $t_2$;

(c) calculating a first number $f_1$ and a second number $f_2$, wherein $f_1$ and $f_2$ denote the number of partitions of table $t_1$ and table $t_2$, respectively, to be joined, wherein calculating $f_1$ and $f_2$ include:

setting n equal to $pc_2-pc_1+1$;

determining a parameter m, which is a maximum number of file contexts;

setting $f_2$ equal to the smallest integer value that is equal to or greater than the value of $((m-n)/2)$; and setting $f_1$ equal to $n+f_2-1$;
(d) determining a first starting partition number $P_1$ for table $t_1$ and a second starting partition number $P_2$ for table $t_2$, wherein $P_1$ and $P_2$ are calculated by,
setting $P_2$ equal to a lowest partition number in $t_2$ such that $P_2$ is a first active, non-eliminated partition in table $t_2$, and at least one of the partitions in the interval between $P_2-pc_2$ and $P_2-pc_1$ in table $t_1$ is an active, non-eliminated partition; and
setting $P_1$ equal to $P_2-pc_2$;
(e) performing a joining algorithm, wherein a set of $f_2$ partitions of table $t_2$ starting at $P_2$ are joined with a set of $f_1$ partitions of table $t_1$ starting at $P_1$, wherein the joining algorithm includes:
creating a file context, which stores at least location data for a row and a first value associated with the row, for each partition of the set of partitions to be joined;
determining the lowest first value stored by the file contexts that is equal to or greater than a particular hash value; and
identifying rows with a particular first value by reading the file contexts;
(f) updating $P_1$ and $P_2$, wherein the updating $P_1$ and $P_2$ includes:
finding a lowest partition number $P_2*$ in $t_2$ that is greater than or equal to the sum of $P2+f2$ such that $P_2*$ is a first active, non-eliminated partition, and at least one of the partitions in the interval between $P_2*-pc_2$ and $P_2*-pc_1$ in table $t_1$ is an active, non-eliminated partition;
setting $P_2$ equal to $P_2*$; and
setting $P_1$ equal to $P_2*-pc_2$; and
(g) repeating steps (e)–(f) while at least one table has at least one active, non-eliminated partition.

15. A computer program, stored in tangible medium, for joining a first table $t_1$ and a second table $t_2$, each table containing rows and columns and being divided into one or more partitions, the program comprising executing instructions that cause a computer to:
(a) calculate a correlation function between a first correlated value column of table $t_1$ and a second correlated value column of table $t_2$;
(b) receive a query requesting a join between table $t_1$ and table $t_2$; and
(c) perform a joining algorithm, wherein the partitions containing the rows to be joined are determined based at least in part upon the correlation function,
wherein the joining algorithm comprises:
(c1) calculating, based at least in part upon the correlation function, a first number $f_1$ and a second number $f_2$, wherein $f_1$ and $f_2$ denote the number of partitions of table $t_1$ and table $t_2$, respectively, to be joined;
(c2) determining, based at least in part upon the correlation function, a first starting partition number $P_1$ for table $t_1$ and a second starting partition number $P_2$ for table $t_2$;
(c3) joining a set of $f_2$ partitions of table $t_2$ starting at $P_2$ with a set of $f_1$ partitions of table $t_1$ starting at $P_1$;
(c4) updating $P_1$ and $P_2$.

16. The computer program of claim 15, wherein (c3) and (c4) are repeated while at least one table has at least one active, non-eliminated partition.

17. The computer program of claim 15, wherein the $f_2$ partitions to be joined in (c3) are contiguous.

18. The computer program of claim 15, wherein the $f_1$ partitions to be joined in (c3) are contiguous.

19. The computer program of claim 15, wherein the $f_2$ partitions to be joined in (c3) are not contiguous.

20. The computer program of claim 15, wherein the $f_1$ partitions to be joined in (c3) are not contiguous.

21. The computer program of claim 15, wherein the span of the $f_1$ partitions in table $t_1$ and the span of the $f_2$ partitions in table $t_2$ to be joined in (c3) are increased, further comprising:
(c31) setting a parameter eps equal to the minimum number of inactive or eliminated partitions in (i) the span of $f_1$ partitions in table $t_1$ beginning at $P_1$ and in (ii) the span of $f_2$ partitions of table $t_2$ beginning at $P_2$;
(c32) increasing the value of $f_2$ by eps;
(c33) increasing the value of $f_1$ by eps; and
(c34) after performing (c4), resetting the value of $f_2$ equal to the value of $f_2$ calculated in (c1) and resetting the value of $f_1$ equal to the value of $f_1$ calculated in (c1).

22. The computer program of claim 21, wherein (c31), (c32), and (c33) are repeated if some of the partitions added in the preceding iteration of (c31), (c32), and (c33) are empty.

23. The computer program of claim 15, wherein the span of the $f_1$ partitions in table $t_1$ and the span of the $f_2$ partitions in table $t_2$ to be joined in c3 is increased, the computer program further comprises:
(c31) setting a parameter eps equal to the result of the function FLOOR(x/2), wherein x is a sum of the number of inactive or eliminated partitions in the span of $f_1$ partitions in table $t_1$ beginning at $P_1$ and the span of $f_2$ partitions in table $t_2$ beginning at $P_2$, and FLOOR(x/2) returns a largest integer that is less than or equal to x/2;
(c32) increasing the value of $f_2$ by eps;
(c33) increasing the value of $f_1$ by eps; and
(c34) after performing (c4), resetting the value of $f_2$ equal to the value of $f_2$ calculated in (c1) and resetting the value of $f_1$ equal to the value of $f_1$ calculated in (c1).

24. The computer program of claim 23, wherein (c31), (c32), and (c33) are repeated if some of the partitions added in the preceding iteration of (c31), (c32), and (c33) are empty.

25. A computer program, stored in tangible medium, for joining a first table $t_1$ and a second table $t_2$, each table containing rows and columns and being divided into one or more partitions, the program comprising executing instructions that cause a computer to:
(a) calculate a correlation function between a first correlated value column of table $t_1$ and a second correlated value column of table $t_2$:
(b) receive a query requesting a join between table $t_1$ and table $t_2$; and
(c) perform a joining algorithm, wherein the partitions containing the rows to be joined are determined based at least in part upon the correlation function,
wherein calculating the correlation function includes:
joining table $t_1$ to table $t_2$ using PK=FK as the join condition to produce a join result having rows, each row including a value from $cv_1$ and a value from $cv_2$, wherein PK denotes a primary key column in table $t_1$, FK denotes a foreign key column in table $t_2$, $cv_1$ denotes a first correlated value column in table $t_1$, and $cv_2$, denotes a second correlated value column in table $t_2$;
creating an initial running constraint (RC), the initial running constraint comprising a null range; and
producing a derived constraint rule (DCR) having the following form:

$$(PK = FK) \rightarrow cv_2 + c_1 \leq cv_1 \leq cv_2 + c_2,$$

where $c_1$ and $c_2$ are constants, and "$\rightarrow$" means "implies;"

by performing the following processing for each row in the join result:

computing a new constraint (NEW), having a range; and modifying RC by merging the range of NEW with the range of RC.

26. The computer program of claim 25, wherein the joining algorithm comprises:

(c1) calculating, based at least in part upon the correlation function, a first number $f_1$ and a second number $f_2$, wherein $f_1$ and $f_2$ denote the number of partitions of table $t_1$ and table $t_2$, respectively, to be joined, wherein:

p is set equal to a size of a partition range of table $t_1$ and table $t_2$;

$pc_1$ is set equal to the value of (SIGN($c_1$)*CEILING(ABS($c_1$)/p)), wherein SIGN($c_1$) returns a value of −1 if $c_1$ is less than zero, otherwise SIGN($c_1$) returns a value of 1, ABS($c_1$) returns an absolute value of $c_1$, and CEILING(ABS($c_1$)/p) returns a smallest integer that is not less than the value of ABS($c_1$)/p;

$pc_2$ is set equal to the value of (SIGN($c_2$)*CEILING(ABS($c_2$)/p)), wherein SIGN($c_2$) returns a value of −1 if $c_2$ is less than zero, otherwise SIGN($c_2$) returns a value of 1, ABS($c_2$) returns an absolute value of $C_2$, and CEILING(ABS($c_2$)/p) returns a smallest integer that is not less than the value of ABS($c_2$)/p;

n is set equal to $pc_2-pc_1+1$, wherein n is a number of contiguous partitions in table $t_1$ that may have rows matching rows in a single partition of table $t_2$;

m is a maximum number of file contexts;

$f_2$ is set equal to the smallest integer value that is equal to or greater than the value of ((m−n)/2);

$f_1$ is set equal to $n+f_2-1$;

(c2) determining, based at least in part upon the correlation function, a first starting partition number $P_1$ for table $t_1$ and a second starting partition number $P_2$ for table $t_2$, wherein:

$P_2$ is set equal to a lowest partition number in table $t_2$ such that $P_2$ is a first active, non-eliminated partition in table $t_2$, and at least one of the partitions in the interval between $P_2$ $pc_2$ and $P_2-Pc_1$ in table $t_1$ is an active, non-eliminated partition;

$P_1$ is set equal to $P_2-pc_2$;

(c3) joining a set of $f_2$ partitions of table $t_2$ starting at $P_2$ with a set of $f_1$ partitions of table $t_1$ starting at $P_1$;

(c4) updating $P_1$ and $P_2$, wherein:

$P_2$ is set equal to a lowest partition number $P_2^*$ in table $t_2$, wherein:

the lowest partition number $P_2'$ is greater than or equal to the sum of $P_2+f_2$;

$P_2^*$ is a first active, non-eliminated partition;

at least one of the partitions in the interval between $P_2^*-pc_2$ and $P_2^*-pc$ in table $t_1$ is an active, non-eliminated partition; and $P_1$ is set equal to $P_2^*-pc_2$.

27. The computer program of claim 26, wherein (c3) and (c4) are repeated while at least one table has at least one active, non-eliminated partition.

28. A system in which a first table $t_1$ is joined with a second table $t_2$, each table containing rows and columns and being divided into one or more partitions comprising:

a massively parallel processing system comprising:

one or more nodes:

a plurality of CPUs, each of the one or more nodes providing access to one or more CPUs:

a plurality of processes each of the one or more CPUs providing access to one or more virtual processes:

each process configured to manage data, including the partitioned database table, stored in one of a plurality of data-storage facilities:

a partitioned table access component configured to select rows from the table by:

(a) calculating correlation function between a first correlated value column of table $t_1$ and a second correlated value column of table $t_2$:

(b) receiving a query requesting a join between table $t_1$ and table $t_2$; and (c) performing a joining algorithm wherein the partitions containing the rows to be joined are determined based at least in part upon the correlation function, wherein the joining algorithm comprises:

(c1) calculating, based at least in part upon the correlation function, a first number $f_1$ and a second number $f_2$, wherein $f_1$ and $f_2$ denote the number of partitions of table $t_1$ and table $t_2$, respectively, to be joined;

(c2) determining, based at least in part upon the correlation function, a first starting partition number $P_1$ for table $t_1$ and a second starting partition number $P_2$ for table $t_2$;

(c3) joining a set of $f_2$ partitions of table $t_2$ starting at $P_2$ with a set of $f_1$ partitions of table $t_1$ starting at $P_1$;

(c4) updating $P_1$ and $P_2$.

29. The system of claim 28, wherein (c3) and (c4) are repeated while at least one table has at least one active, non-eliminated partition.

30. The system of claim 28, wherein the $f_2$ partitions to be joined in (c3) are contiguous.

31. The system of claim 28, wherein the $f_1$ partitions to be joined in (c3) are contiguous.

32. The system of claim 28, wherein the $f_2$ partitions to be joined in (c3) are not contiguous.

33. The system of claim 28, wherein the $f_1$ partitions to be joined in (c3) are not contigu. The system of claim 36, wherein the span of the $f_1$ partitions in table $t_1$ and the span of the $f_2$ partitions in table $t_2$ to be joined in (c3) are increased, further comprising:

(c31) setting a parameter eps equal to the minimum number of inactive or eliminated partitions in (i) the span of $f_1$ partitions in table $t_1$ beginning at $P_1$ and in (ii) the span of $f_2$ partitions of table $t_2$ beginning at $P_2$;

(c32) increasing the value of $f_2$ by eps;

(c33) increasing the value of $f_1$ by eps; and (c34) after performing (c4), resetting the value of $f_2$ equal to the value of $f_2$ calculated in (c1) and resetting the value of $f_1$ equal to the value of $f_1$ calculated in (c1).

34. The system of claim 28, wherein the span of the $f_1$ partitions in table $t_1$ and the span of the $f_2$ partitions in table $t_2$ to be joined in (c3) are increased, further comprising:

(c31) setting a parameter eps equal to the minimum number of inactive or eliminated partitions in (i) the span of $f_1$ partitions in table $t_1$ beginning at $P_1$ and in (ii) the span of $f_2$ partitions of table $t_2$ beginning at $P_2$;

(c32) increasing the value of $f_2$ by eps;

(c33) increasing the value of $f_1$ by eps; and (c34) after performing (c4), resetting the value of $f_2$ equal to the value of $f_2$ calculated in (c1) and resetting the value of $f_1$ equal to the value of $f_1$ calculated in (c1).

35. The system of claim 34, wherein (c31), (c32), and (c33) are repeated if some of the partitions added in the preceding iteration of (c31), (c32), and (c33) are empty.

36. The system of claim 28, wherein the span of the $f_1$ partitions in table $t_1$ and the span of the $f_2$ partitions in table $t_2$ to be joined in c3 is increased, the system further comprises:
 (c31) setting a parameter eps equal to the result of the function FLOOR(x/2), wherein x is a sum of the number of inactive or eliminated partitions in the span of $f_1$ partitions in table $t_1$ beginning at $P_1$ and the span of $f_2$ partitions in table $t_2$ beginning at $P_2$, and FLOOR (x/2) returns a largest integer that is less than or equal to x/2;
 (c32) increasing the value of $f_2$ by eps;
 (c33) increasing the value of $f_1$ by eps; and
 (c34) after performing (c4), resetting, the value of $f_2$ equal to the value of $f_2$ calculated in (c1) and resetting the value of $f_1$ equal to the value of $f_1$ calculated in (c1).

37. The system of claim 36, wherein (c31), (c32), and (c33) are repeated if some of the partitions added in the preceding iteration of (c31), (c32), and (c33) are empty.

38. A system in which a first table $t_1$ is joined with a second table $t_2$, each table containing rows and columns and being divided into one or more partitions comprising:
 a massively parallel processing system comprising:
 one or more nodes;
 a plurality of CPUs, each of the one or more nodes providing access to one or more CPUs;
 a plurality of processes each of the one or more CPUs providing access to one or more virtual processes;
 each process configured to manage data, including the partitioned database table, stored in one of a plurality of data-storage facilities;
 a partitioned table access component configured to select rows from the table by:
  (a) calculating correlation function between a first correlated value column of table $t_1$ and a second correlated value column of table $t_2$;
  (b) receiving a query requesting a join between table $t_1$ and table $t_2$; and
  (c) performing a joining algorithm, wherein the partitions containing the rows to be joined are determined based at least in part upon the correlation function,
 wherein calculating the correlation function includes;
  joining table $t_1$ to table $t_2$ using PK=FK as the join condition to produce a join result having rows, each row including a value from $cv_1$ and a value from $cv_2$, wherein PK denotes a primary key column in table $t_1$, FK denotes a foreign key column in table $t_2$, $cv_1$ denotes a first correlated value column in table $t_1$, and $cv_2$, denotes a second correlated value column in table $t_2$;
  creating an initial running constraint (RC), the initial running constraint comprising a null range; and
  producing a derived constraint rule (DCR) having the following form:

$$(PK = FK) \rightarrow cv_2 + c_1 \le cv_1 \le cv_2 + c_2,$$

where $c_1$ and $c_2$ are constants, and "$\rightarrow$" means "implies;"
 by performing the following processing for each row in the join result:
  computing a new constraint (NEW), having a range; and
  modifying RC by merging the range of NEW with the range of RC.

39. The system of claim 38, wherein the joining algorithm comprises:
 (c1) calculating, based at least in part upon the correlation function, a first number f, and a second number $f_2$, wherein $f_1$ and $f_2$ denote the number of partitions of table $t_1$ and table $t_2$, respectively, to be joined, wherein:
  p is set equal to a size of a partition range of table $t_1$ and table $t_2$;
  $pc_1$ is set equal to the value of (SIGN($c_1$)*CEILING (ABS($c_1$)/p)), wherein SIGN($c_1$) returns a value of $-1$ if $c_1$ is less than zero, otherwise SIGN($c_1$) returns a value of 1, ABS($c_1$) returns an absolute value of $c_1$, and CEILING(ABS($c_1$)/p) returns a smallest integer that is not less than the value of ABS($c_1$)/p;
  $pc_2$ is set equal to the value of (SIGN($c_2$)*CEILING (ABS($c_2$)/p)), wherein SIGN($c_2$) returns a value of $-1$ if $c_2$ is less than zero, otherwise SIGN($c_2$) returns a value of 1, ABS($c_2$) returns an absolute value of $c_2$, and CEILING(ABS($c_2$)/p) returns a smallest integer that is not less than the value of ABS($c_2$)/p;
  n is set equal to $pc_2-pc_1+1$, wherein n is a number of contiguous partitions in table $t_1$ that may have rows matching rows in a single partition of table $t_2$;
  m is a maximum number of file contexts;
  $f_2$ is set equal to the smallest integer value that is equal to or greater than the value of $((m-n)/2)$;
  $f_1$ is set equal to $n+f_2-1$;
 (c2) determining, based at least in part upon the correlation function, a first starting partition number $P_1$ for table $t_1$ and a second starting partition number $P_2$ for table $t_2$; wherein:
  $P_2$ is set equal to a lowest partition number in table $t_2$ such that $P_2$ is a first active, non-eliminated partition in table $t_2$, and at least one of the partitions in the interval between $P_2-pc_2$ and $P_2-pc_1$ in table $t_1$ is an active, non-eliminated partition;
  $P_1$ is set equal to $P_2-pc_2$;
 (c3) joining a set of $f_2$ partitions of table $t_2$ starting at $P_2$ with a set of $f_1$ partitions of table $t_1$ starting at $P_1$;
 (c4) updating $P_1$ and $P_2$, wherein:
  $P_2$ is set equal to a lowest partition number $P_2^*$ in table $t_2$, wherein:
   the lowest partition number $P_2^*$ is greater than or equal to the sum of $P_2+f_2$;
   $P_2^*$ is a first active, non-eliminated partition;
   at least one of the partitions in the interval between $P_2^*-pc_2$ and $P_2^*-pc_1$ in table $t_1$ is an active, non-eliminated partition; and
  $P_1$ is set equal to $P_2^*-pc_2$.

40. The system of claim 39, wherein (c3) and (c4) are repeated while at least one table has at least one active, non-eliminated partition.

* * * * *